US009231465B2

(12) United States Patent
Hara

(10) Patent No.: US 9,231,465 B2
(45) Date of Patent: Jan. 5, 2016

(54) MOTOR CONTROL APPARATUS

(71) Applicant: DENSO CORPORATION, Kariya, Aichi-pref. (JP)

(72) Inventor: Yoshimichi Hara, Kuwana (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/487,455

(22) Filed: Sep. 16, 2014

(65) Prior Publication Data

US 2015/0084570 A1    Mar. 26, 2015

(30) Foreign Application Priority Data

Sep. 20, 2013  (JP) ................................ 2013-194909

(51) Int. Cl.
| H02P 27/06 | (2006.01) |
| H02M 1/32 | (2007.01) |
| B62D 5/04 | (2006.01) |
| H02M 7/219 | (2006.01) |
| H02P 25/22 | (2006.01) |
| H02P 29/00 | (2006.01) |
| H02P 29/02 | (2006.01) |
| H02P 21/00 | (2006.01) |

(52) U.S. Cl.
CPC .............. *H02M 1/32* (2013.01); *B62D 5/0403* (2013.01); *B62D 5/0463* (2013.01); *B62D 5/0484* (2013.01); *B62D 5/0496* (2013.01); *H02M 7/219* (2013.01); *H02P 21/0035* (2013.01); *H02P 25/22* (2013.01); *H02P 27/06* (2013.01); *H02P 29/0088* (2013.01); *H02P 29/022* (2013.01)

(58) Field of Classification Search
CPC ................. H02P 27/06; H02M 1/32
USPC .......................................... 318/494, 495, 496
See application file for complete search history.

(56) References Cited

U.S. PATENT DOCUMENTS

| 5,414,339 A * | 5/1995 | Masaki ................... B60L 3/003 318/139 |
| 6,018,694 A * | 1/2000 | Egami ...................... B60K 6/24 180/65.23 |
| 8,680,808 B2 * | 3/2014 | Mukai .................. B62D 5/0403 318/400.21 |
| 2011/0288706 A1 | 11/2011 | Okamura |
| 2013/0033210 A1 | 2/2013 | Suzuki et al. |

FOREIGN PATENT DOCUMENTS

| JP | 2003-153588 | 5/2003 |
| JP | 2008-092739 | 4/2008 |

(Continued)

OTHER PUBLICATIONS

Office Action (4 pages) dated Jul. 28, 2015, issued in corresponding Japanese Application No. 2013-194909 and English translation (4 pages).

*Primary Examiner* — David S Luo
(74) *Attorney, Agent, or Firm* — Nixon & Vanderhye PC

(57) ABSTRACT

A motor control apparatus controlling a driving of a motor having two pairs of winding sets is provided. The motor control apparatus includes a current command value calculation portion, a first system, a second system, and a temperature difference calculation portion. The first system includes a first power inverter circuit, a first temperature sensor, a first current limit setting portion, and a first controller. The second system includes a second power inverter circuit, a second temperature sensor, a second current limit setting portion, and a second controller. One of the first controller and the second controller stops a driving of one of the first power inverter circuit and the second power inverter circuit or reduces the current limiting value of this.

4 Claims, 9 Drawing Sheets

(56) References Cited

FOREIGN PATENT DOCUMENTS

| | | |
|---|---|---|
| JP | 2010-130793 | 6/2010 |
| JP | 2010-139244 | 6/2010 |
| JP | 2010-172124 | 8/2010 |
| JP | 2013-005669 | 1/2013 |
| JP | 2013-038950 | 2/2013 |

* cited by examiner

FIG. 9

| DET TEMP | ROUGH DWG | | | | | | | | |
|---|---|---|---|---|---|---|---|---|---|
| | Tz ——— TEMP ↑ | Ts1 Ts2 ΔTs | | Ts1 Ts2 ΔTs | | Ts1 Ts2 ΔTs | | Ts1 Ts2 ΔTs | |
| | Ts1 | <Tz | | <Tz | | <Tz | | ≧Tz | |
| | Ts2 | <Tz | | <Tz | | ≧Tz | | ≧Tz | |
| | ΔTs=\|Ts1−Ts2\| | <ΔTx | | ≧ΔTx | | NOT CONSIDERED | | NOT CONSIDERED | |
| DET | 1ST SYSTEM DRIVE | ○ | | × | | × | | × | |
| | 2ND SYSTEM DRIVE | ○ | | ○ | | ○ | | × | |

# MOTOR CONTROL APPARATUS

CROSS REFERENCE TO RELATED APPLICATION

This application is based on Japanese Patent Application No. 2013-194909 filed on Sep. 20, 2013, the disclosure of which is incorporated herein by reference.

TECHNICAL FIELD

The present disclosure relates to a motor control apparatus controlling a driving of a motor.

BACKGROUND

Patent document 1: JP-A-2003-153588

A conventional motor control apparatus controls a driving of a motor having multiple winding sets with multiple power inverter circuits. In addition, the apparatus has a temperature sensor to detect a temperature of a power switching element that receives large electric current, the temperature sensor being provided near the power inverter circuit. The apparatus monitors an abnormal heat generation in the power switching element.

For example, in a motor driving apparatus described in patent document 1, temperature sensors provided in or near power modules of two inverter circuits detect the temperature of the power module respectively. When a temperature by a calorific value of one of the power module exceeds a temperature threshold, an inverter circuit connected to a motor is switched over to the other of the power module.

The applicant of the present disclosure has found the following.

In the apparatus of patent document 1, a temperature abnormality is determined whether the temperature value of the power module exceeds the temperature threshold, from only an absolute viewpoint. In this determination manner, as long as the temperature value is in an allowable temperature range to the temperature threshold, a slight abnormality that is somewhat deviated from an originally desired condition may not be detected.

For example, in a manufacturing process of an apparatus, it is supposed that an application state of a heat radiation gel applied between an element and a heat sink in two systems of power inverter circuits has variation. In this case, since a difference in a radiation performance of the two systems of the power inverter circuits exists, this may not be a preferable state. However, when the temperature of the two systems of the power inverter circuits are in an allowable temperature range absolutely (that is, from the absolute viewpoint), it may be determined with a normal state according to a conventional technology.

SUMMARY

It is an object of the present disclosure to provide a motor control apparatus detecting a temperature abnormality of a power inverter circuit widely, the motor control apparatus having two systems of power inverter circuits.

According to one aspect of the present disclosure, a motor control apparatus controlling a driving of a motor having two pairs of winding sets is provided. The motor control apparatus includes a current command value calculation portion calculating a current command value supplied to the motor, a first system, a second system, and a temperature difference calculation portion obtaining the first detection temperature and the second detection temperature and calculating a system-to-system temperature difference. The first system includes a first power inverter circuit provided to the motor control apparatus, corresponding to one of the two pairs of the winding sets and supplying electricity to the one of the two pairs of the winding sets, and a first temperature sensor detecting a first detection temperature of the first power inverter circuit, a first current limit setting portion setting up a current limiting value, which is an upper limit of the current command value, and a first controller controlling an output to the first power inverter circuit by a current feedback control to the first system. The second system includes a second power inverter circuit provided to the motor control apparatus, corresponding to an other of the two pairs of the winding sets and supplying electricity to the other of the two pairs of the winding sets, in which the first power inverter circuit and the second power inverter circuit have an equivalent specification and an equivalent electrical performance, a second temperature sensor detecting a second detection temperature of the second power inverter circuit, a second current limit setting portion setting up the current limiting value, which is the upper limit of the current command value, and a second controller controlling the output to the second power inverter circuit by the current feedback control to the second system. The system-to-system temperature difference is defined as an absolute value of a difference of the first detection temperature and the second detection temperature. One of the first controller and the second controller stops a driving of one of the first power inverter circuit and the second power inverter circuit or reduces the current limiting value of the one of the first power inverter circuit and the second power inverter circuit when the system-to-system temperature difference is equal to or more than a predetermined temperature difference threshold. The one of the first power inverter circuit and the second power inverter circuit is included in one of the first system and the second system having a detection temperature higher than an other of the first system and the second system.

According to the present disclosure, since the temperature abnormality is determined based on the system-to-system temperature difference from a relative viewpoint, it may be possible to detect an abnormality that absolutely exceeds the temperature threshold, and in addition, it may be possible to widely detect a slight abnormality that may not result in a destruction of an element.

In addition, in the slight abnormality to that extent, the driving of the power inverter circuit of the system with a higher detection temperature than the other system may not require to stop thoroughly. Therefore, the controller may reduce the current limiting value according to a state, so that the power inverter circuit may continuously drive while being limited. Accordingly, it may be possible to prevent a total output of the two systems from being declined extremely, or it may be possible to prevent an excessive load from being applied to a normal system.

BRIEF DESCRIPTION OF THE DRAWINGS

The above and other objects, features and advantages of the present disclosure will become more apparent from the following detailed description made with reference to the accompanying drawings. In the drawings:

FIG. 9 is a drawing illustrating a pattern table of a temperature difference monitoring processing in the second embodiment of the present disclosure.

DETAILED DESCRIPTION

Followingly, embodiments in which a motor control apparatus according to the present disclosure is applied to an electric power steering apparatus of a vehicle will be described based on drawings.

(First Embodiment)

A motor control apparatus according to the first embodiment of the present disclosure will be explained with reference to FIG. 1 to FIG. 7.

Figure 2:
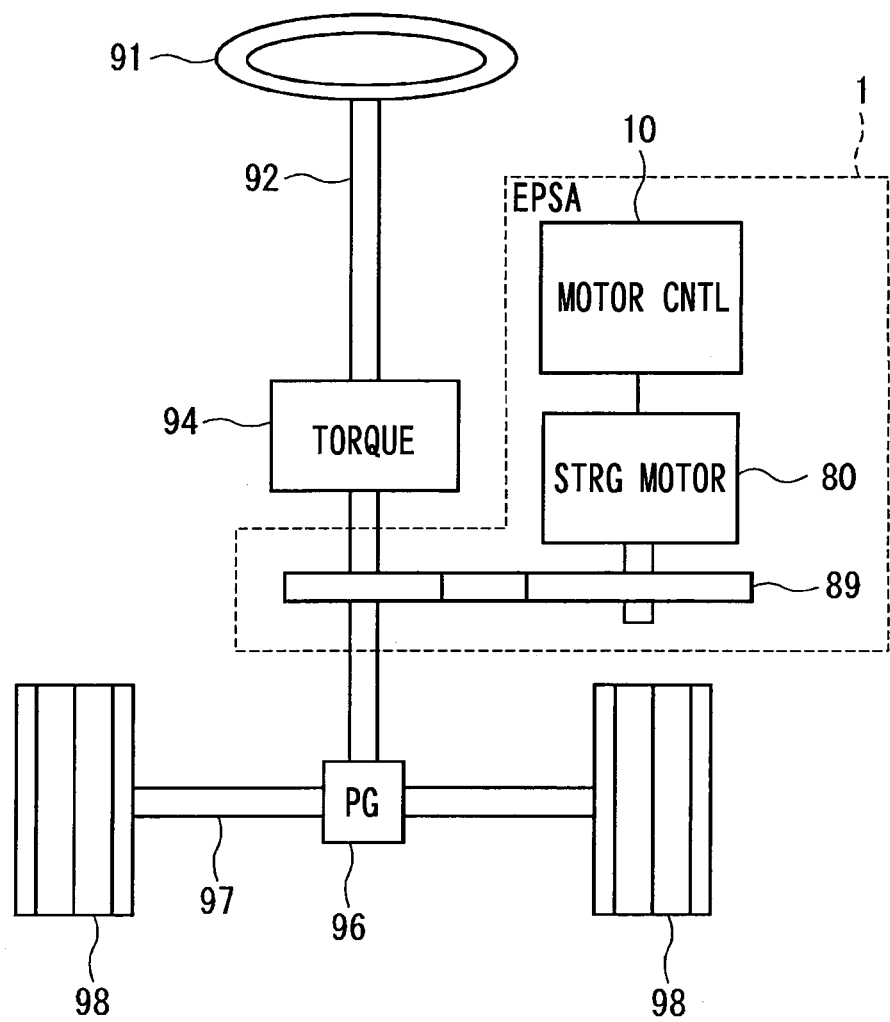
FIG. 2 is a drawing of a schematic block diagram of an electric power steering apparatus using the motor control apparatus in the first embodiment of the present disclosure.

FIG. 2 is an entire configuration of a steering system 90 provided with an electric power steering apparatus 1. A torque sensor 94 detecting a steering torque is provided in a steering shaft 92 connected to a steering wheel 91. The steering shaft 92 has a pinion gear 96 at the end of the steering shaft 92. The pinion gear 96 engages with a rack shaft 97. A pair of wheels 98 is rotatably connected with both ends of the rack shaft 97 through a tie rod or the like. A rotation of the steering shaft 92 is converted into a rectilinear motion of the rack shaft 97 by the pinion gear 96. The pair of the wheels 98 is steered with respect to an angle according to a rectilinear-motion displacement of the rack shaft 97.

The electric power steering device 1 includes a reduction gear 89 that slows down a rotation of an output axis of the motor control apparatus 10, the steering assist motor 80 (also referred to as a motor for simplicity), and a motor 80, and transmits to the steering shaft 92. The motor 80 in the present embodiment is a three-phase brushless motor, and makes the reduction gear 89 rotate reversely.

The motor control apparatus 10 controls a driving of the motor 80 based on a steering torque signal from the torque sensor 94, a rotation angle signal from the rotation angle sensor 85 (referring to FIG. 5), or the like. Accordingly, the motor 80 generates a steering assist torque to assist a steering of the steering wheel 91 by an operator, and transmits the steering assist torque to the steering shaft 92.

Figure 1:
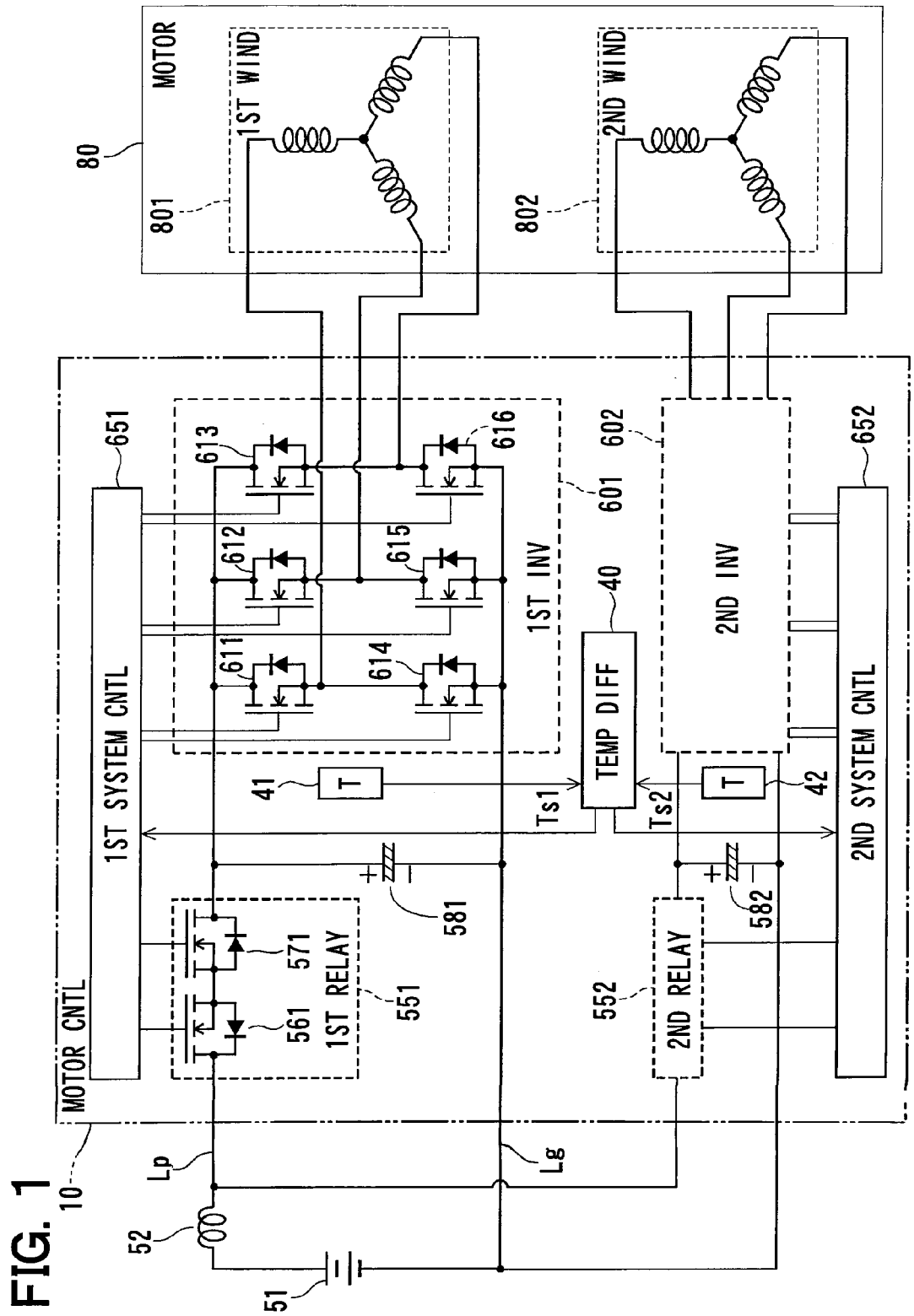
FIG. 1 is a drawing schematically illustrating a circuit of a motor control apparatus in a first embodiment of the present disclosure.

As described in FIG. 1, the motor 80 has two sets of the three-phase winding sets 801, 802. The motor control apparatus 10 includes two inverters 601, 602 corresponding to the two sets of the winding sets 801, 802. The motor control apparatus 10 drives the motor 80 with power outputted by the inverters 601, 602. Therefore, a configuration having two systems is implemented as a redundant design. Even when the inverter in one system may become in a malfunction, the driving of the motor 80 may be continued by the inverter in another system. It may be possible to improve reliability. In other words, the motor 80 continues to drive using the inverter of another system.

In the following description, regarding symbols of a component, a symbol "1" at a tail of triple figures represents a component of a first system, and a symbol "2" at a tail of triple figures represents a component of a second system in order to distinguish the first system and the second system in principle. Incidentally, a first temperature sensor 41 and a second temperature sensor 42 correspond to an exception and have a symbol of double figures. The first temperature sensor 41 is included in the first system, and the second temperature sensor 42 is included in the second system. In addition, inverter switching elements 611 to 616, which are included in the first system, are also considered as an exception.

The motor control apparatus 10 includes power supply relay parts 551, 552, electrolytic capacitors 581, 582, inverters 601, 602, controllers 651, 652, and temperature sensors 41, 42 for each system. The controller 651 may correspond to a first controller in the present disclosure, and the controller 652 may correspond to a second controller. The inverters 601, 602 correspond to power inverter circuits in the present disclosure. The inverter 601 may correspond to a first power inverter circuit, and the inverter 602 may correspond to a second power inverter circuit. Detailed drawings of the power supply relay part 552 and the inverter 602 of the second system are omitted in FIG. 1. They are the same with the power supply relay part 551 and the inverter 601 of the first system.

In addition, the motor control apparatus 10 includes a temperature difference calculation portion 40 over the two systems. The temperature difference calculation portion 40 corresonds to a temperature difference calculation portion in the present disclosure.

Direct current (DC) power (for example, 12V) from a battery 51 is inputted into a coil 52, branched and inputted into the two systems in the motor control apparatus 10.

Followingly, a configuration of the first system will be explained as an example.

The power supply relay part 551 is provided in a power path Lp from the battery 51 to the inverter 601. The power supply relay part 551 in the present embodiment has two power relay switching elements 561, 571. Parasitic diodes in the two power relay switching elements 561, 571 are connected to in series in a reverse direction mutually. The power relay switching element 561 prevents that a current flows into the inverter 601 from the battery 51 at the time of cutoff, in a case where the battery 51 is connected with a polarity as described in FIG. 1. The power relay switching element 571 prevents that a current flows into the inverter 601 from the battery 51 at the time of cutoff in a case where the battery 51 is connected with a reverse polarity as described in FIG. 1.

The electrolytic capacitor 581 is connected between the power path Lp and a ground path Lg at an input part of the inverter 601. The electrolytic capacitor 581 stores an electric charge, assists an electric power supply to the inverter 601, and smoothes a pulsation.

The first system inverter 601 is provided with a bridge connection of six switching elements 611 to 616, so that an electric supply is switched to each phase winding of the winding set 801. A configuration of a three-phase inverter circuit may be well-known art, and a detailed description will be omitted.

The controller 651 includes a microcomputer, a drive circuit (a predriver), or the like (not shown). The controller 651 performs a control calculation about each operational value according to a control based on the input signals such as the torque signal and the rotation angle signal. In addition, the controller 651 outputs a switching signal to gates of the power relay switching elements 561, 571 and the inverter switching elements 611 to 616. Incidentally, the power relay switching elements 561, 571 and the inverter switching elements 611 to 616 are MOSFET (a metal oxide semiconductor field-effect transistor), for example.

A configuration of the second system is the same with the configuration of the first system.

Figure 3A:
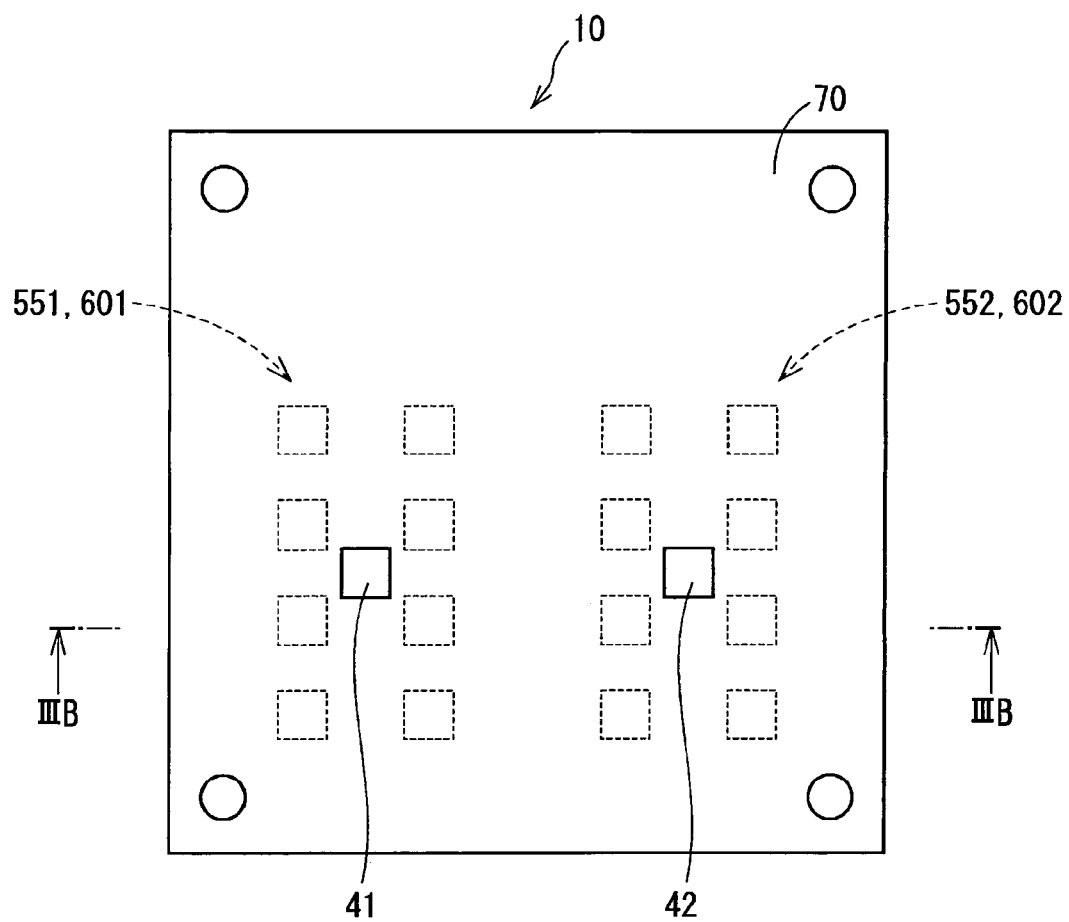
FIG. 3A is a plan view illustrating the motor control apparatus mounted on a substrate in the first embodiment of the present disclosure.

With referring to FIG. 3A, FIG. 3B and FIG. 4, a physical configuration of a substrate 70 to which the motor control apparatus 10 is mounted will be explained. As described in FIG. 3A, in the present embodiment, eight switching elements including the power supply relay parts 551, 552, and the inverters 601, 602 are arranged by two rows along a horizontal direction in the drawing and arranged by four rows per system. The switching elements of the first system are described with a symbol "61". The switching elements of the second system are described with a symbol "62" collectively.

The switching element 61 of the first system and the switching element 62 of the second system are arranged almost symmetrically. The switching element 61 and the switching element 62 are set up so as to have an equivalent circuit pattern, an equivalent heat radiating resistance, or the like of the substrate. That is, the inverters 601, 602 of the two systems have a mutually equivalent specification and an electrical performance.

Figure 3B:
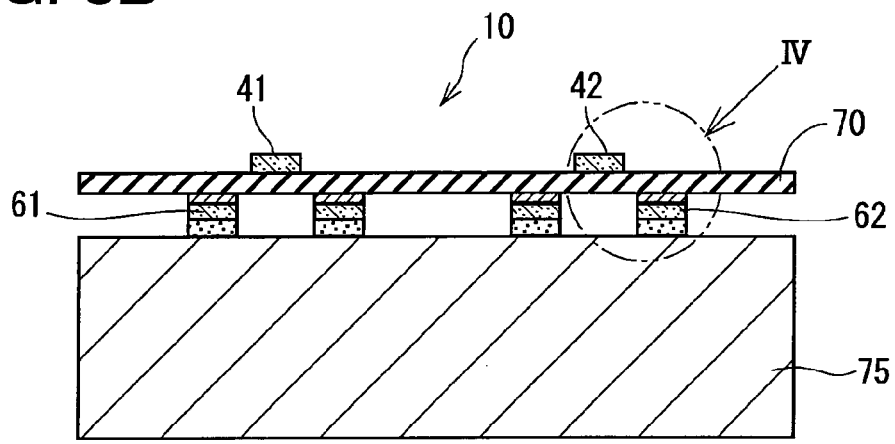
FIG. 3B is a sectional view taken along line IIIB-IIIB in FIG. 3A.
Figure 4:
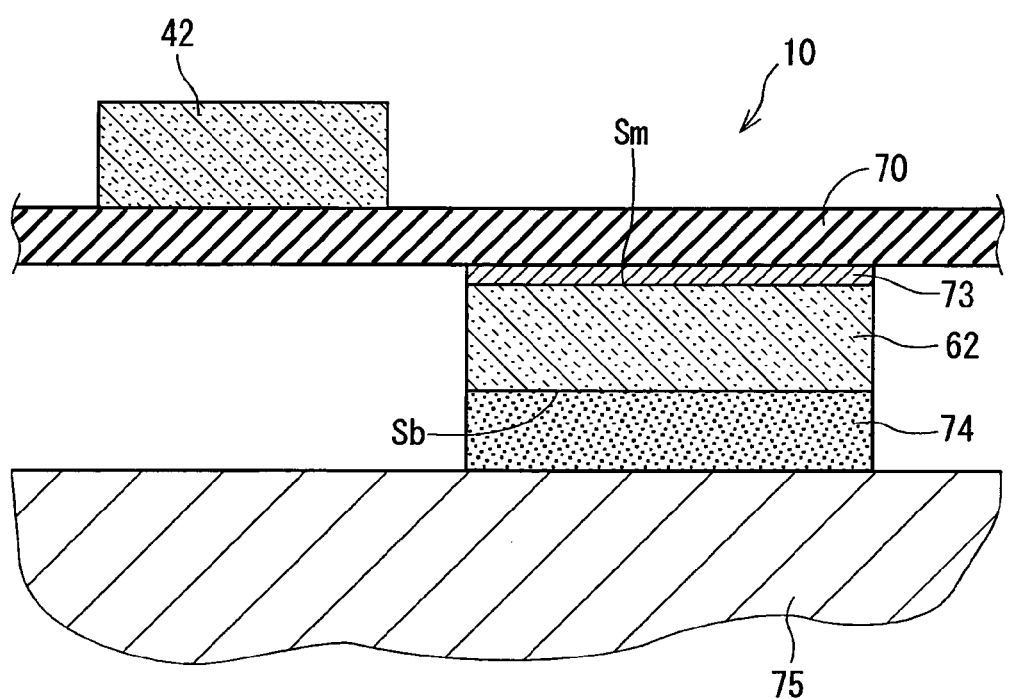
FIG. 4 is an enlarged view of a part IV in FIG. 3B.

As described in FIG. 3B and FIG. 4, a mounting surface Sm of the switching elements 61, 62 at a side of the substrate 70 corresponds to a surface mounted to the substrate 70 by a solder 73. A heat sink 75 is provided at an opposite side of the switching elements 61, 62 from the substrate 70 and the heat sink 75 is positioned separated from a back surface Sb by a predetermined distance. A heat radiation gel 74 is applied between each of the switching elements 61, 62 and the heat sink 75. The heat sink 75 is a housing of aluminum, for example.

According to this configuration, heat generated in the switching elements 61, 62 is radiated through two paths including one path transmitted from the mounting surface Sm to the substrate 70 and the other path transmitted from the back surface Sb to the heat sink 75 through the heat radiation gel 74. Since generation of heat by a large electric current is relatively large in the motor control apparatus 10 applied to the electric power steering apparatus 1, it may be effective to adopt a heat radiation configuration with two paths.

The temperature sensors 41, 42 and the temperature difference calculation portion 40 will be explained. As described in FIG. 3A and FIG. 3B, the temperature sensors 41, 42 are mounted at the center position of the array of the switching elements 61, 62 of each of the systems on the substrate 70. The first temperature sensor 41 mainly detects heat generated by a switching element comprising the inverter 601 of the first system. The second temperature sensor 42 mainly detects heat generated by a switching element comprising the inverter 602 of the second system. Incidentally, the power relay switching elements 561, 571 may not heavily influence on generation of heat.

The first temperature sensor 41 detects a detection temperature Ts1 of the inverter 601. The second temperature sensor 42 detects the detection temperature Ts2 of the inverter 602. The detection temperature Ts1 may correspond to a first detection temperature and the detection temperature Ts2 may correspond to a second detection temperature in the present disclosure. The detection temperature Ts1 and the detection temperature Ts2 are inputted into the temperature difference calculation portion 40. The temperature difference calculation portion 40 calculates a system-to-system temperature difference, which is equal to an absolute value of a difference of the detection temperatures of the first temperature sensor 41 and the second temperature sensor 42. The system-to-system temperature difference will be described in detail below.

A control block of the motor control apparatus 10 will be explained with reference to FIG. 5.

The current command value calculation portion 15 calculates dq-axis current command values Id*, Iq* based on a steering torque signal Tq* inputted from the torque sensor 94. The dq-axis current command values Id*, Iq* are inputted in common with the controller 651 of the first system and the controller 652 of the second system.

The controller 651 of the first system includes a current limit setting portion 201 (also referred to as a first current limit setting portion), a three phase-two phase conversion portion 251, a controller 301, and a two phase-three phase conversion portion 351. The controller 651 of the first system controls the driving of the inverter 601 of the first system by a current feedback control.

The current limit setting portion 201 sets up current limiting values Id1, Iq1, which are used as an upper limit of the dq-axis current command values Id*, Iq*. In the present embodiment, the current limit setting portion 201 reduces the current limiting values Id1, Iq1 based on temperature information inputted from the temperature difference calculation portion 40. The three phase-two phase conversion portion 251, the controller 301, and the two phase-three phase conversion portion 351 may be a well-known configuration related to a current feedback control. The three phases of phase currents Iu1, Iv1, Iw1 supplied to the winding set 801 from the inverter 601 are detected by a current sensor 691. In addition, an electrical angle of the motor 80 is detected by the rotation angle sensor 85. The three phase-two phase conversion portion 251 performs a dq conversion from the detected values of the three phases currents Iu1, Iv1, Iw1 to a d-axis current detection value Id1 and a q-axis current detection value Iq1 based on a rotation angle θ fed back from the rotation angle sensor 85.

The controller 301 receives a difference of the current limiting value Id1 and the detection value Id1 of the d-axis current, and a difference of the current limiting value Iq1 and the detection value Iq1 of the q-axis current. The controller 301 calculates voltage command values Vd1, Vq1 so that the differences may be converged into 0 (zero). The controller 301 corresponds to a PI (proportional integral) control calculation, for example. The controller 301 calculates the voltage command values Vd1, Vq1 based on a proportional gain and an integration gain.

Based on the rotation angle θ fed back from the rotation angle sensor 85, the two phase-three phase conversion portion 351 performs a reverse dq conversion from the two phase voltage command values Vd1, Vq1 to the three phase voltage command values Vu1, Vv1, Vw1 having an U phase, a V phase, and a W phase respectively, and outputs the three phase voltage command values Vu1, Vv1, Vw1 to the inverter 601 of the first system.

The controller 652 of the second system includes a current limit setting portion 202 (also referred to as a second current limit setting portion), a three phase-two phase conversion portion 252, a controller 302, and a two phase-three phase conversion portion 352. Phase currents Iu2, Iv2, Iw2 detected by the current sensor 692 are fed back in to the controller 652 of the second system. Since the configuration is the same with the configuration of the first system, an explanation will be omitted. Incidentally, a symbol of current and a symbol of voltage according to the second system are equivalent to current and voltage of the first system except that tail numbers of symbols of the first system are changed into "2" from "1."

Figure 5:
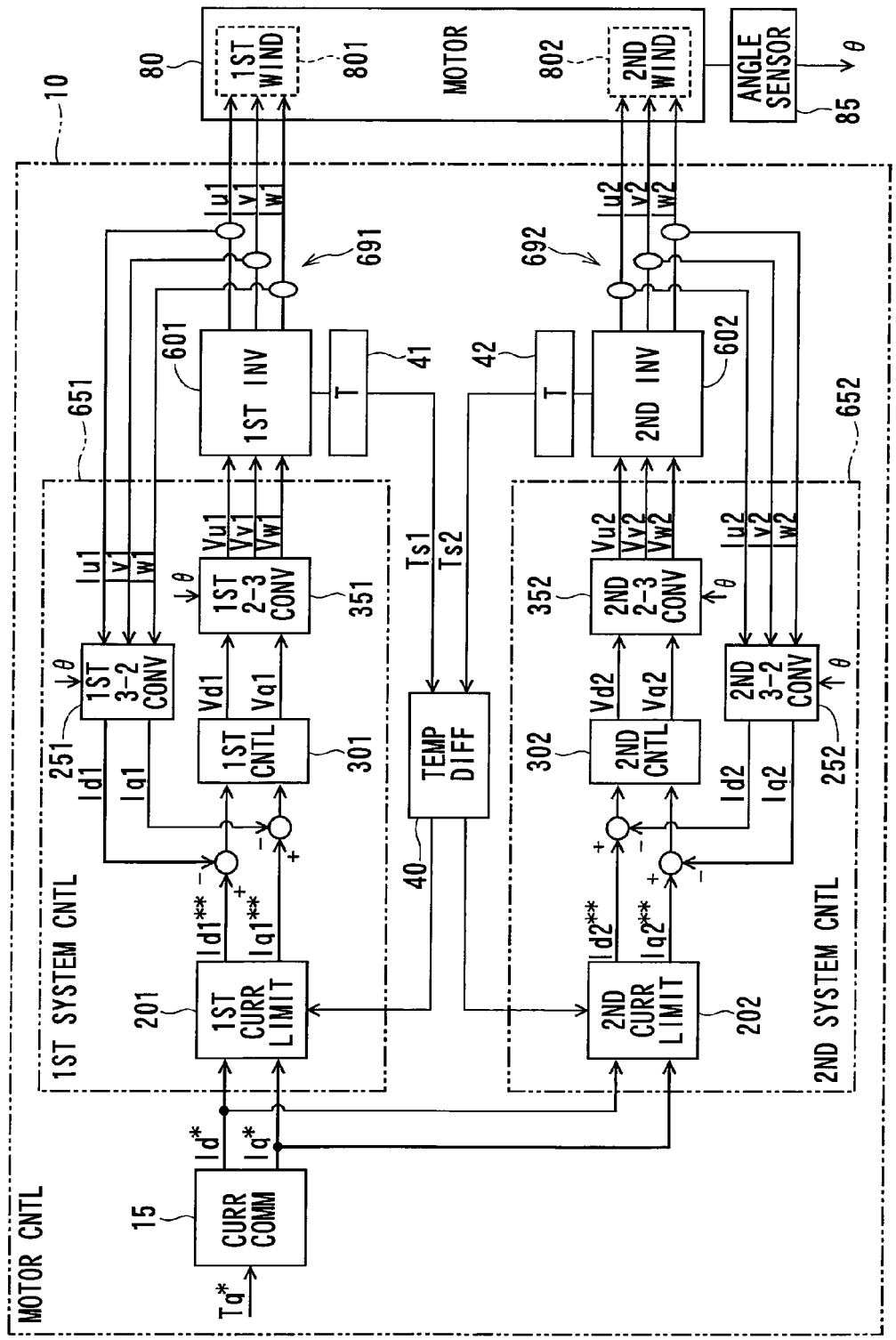
FIG. 5 is a block diagram of the motor control apparatus in the first embodiment of the present disclosure.

That is, the dq-axis current command values Id*, Iq* calculated by the current command value calculation portion 15 are inputted into the current limit setting portions 201, 202 as described in FIG. 5

Figure 6:
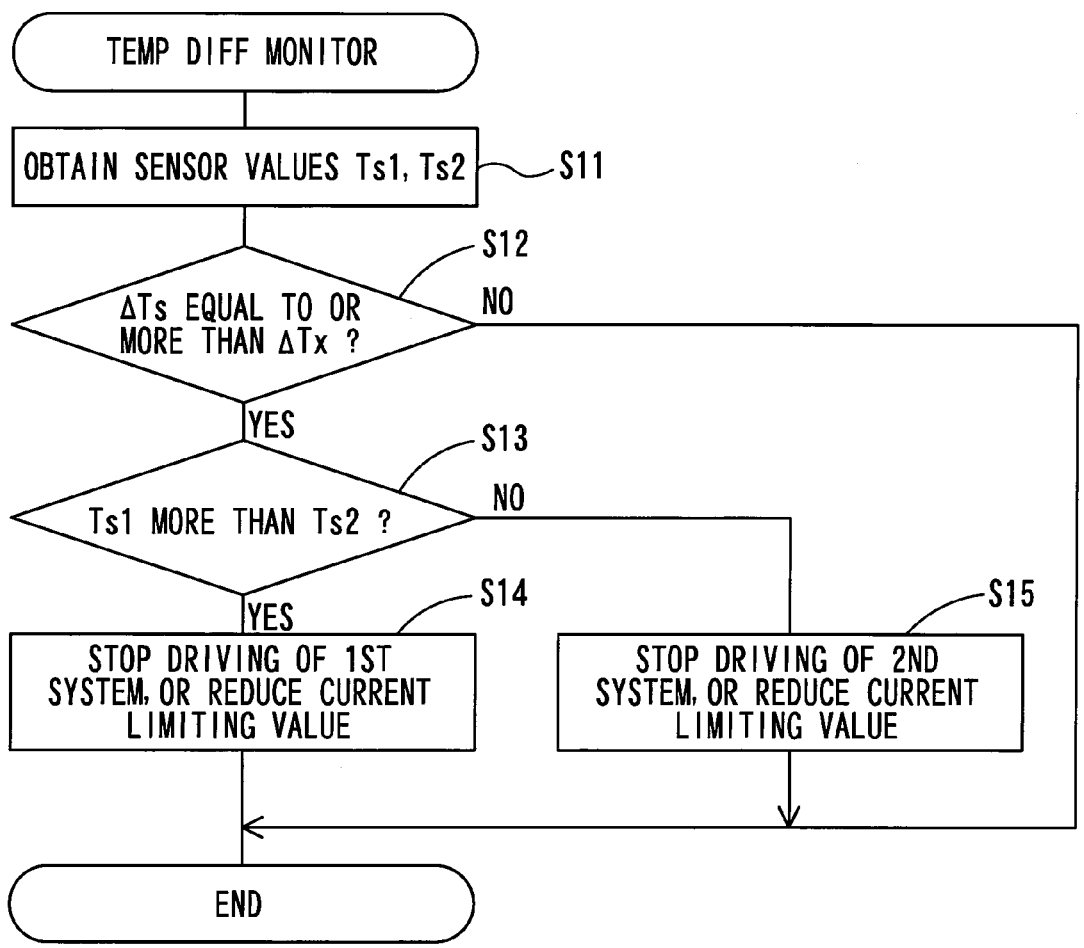
FIG. 6 is a flowchart of a temperature difference monitoring processing in the first embodiment of the present disclosure.

A temperature difference monitoring processing performed by the temperature difference calculation portion 40 and the controllers 651, 652 will be explained with reference to a flowchart of FIG. 6. A symbol "S" in the flowchart in the present embodiment means a step or may mean a section.

In S11, the temperature difference calculation portion 40 obtains the sensor value Ts1 of the first temperature sensor 41 and the sensor value Ts2 of the second temperature sensor 42. Hereinafter, a "sensor value" may be used as synonymous with a "detection temperature".

A system-to-system temperature difference ΔTs means an absolute value (|Ts1 −Ts2 |) of a difference of the sensor values Ts1 , Ts2 . In S12, the system-to-system temperature difference ΔTs is compared with the temperature difference threshold ΔTx.

When the system-to-system temperature difference ΔTs is equal to or more than the temperature difference threshold ΔTx (S12: YES), it is determined which of the sensor value Ts1 and Ts2 is higher than the other at S13. When the sensor value Ts1 is more than the sensor value Ts2 (S13: YES), the processing is moved to S14. At S14, a driving of the inverter 601 of the first system is stopped or a current limiting value is reduced. When the sensor value Ts2 is higher than the sensor value Ts1 (S13: NO), the processing is moved to S15. At S15, a driving of the inverter 602 of the second system is stopped or a current limiting value is reduced.

On the other hand, when the system-to-system temperature difference ΔTs is less than the temperature difference threshold ΔTx (S12: NO), the processing is ended.

When the current limiting value of the inverter 601 of the first system is reduced in S14, the temperature difference calculation portion 40 communicates to the current limit setting portion 201 of the first system. The temperature difference calculation portion 40 reduces the current limiting values Id1 , Iq1  and controls an output limit value of the inverter 601. When the driving of the inverter 601 stops, the current limiting values Id1 , Iq1  are reduced to zero. Incidentally, a value of zero is not limited to a value of 0 [A] strictly, and the value of zero means a value equivalent to 0 [A] substantially.

When the current limiting value of the inverter 602 of the second system is reduced or when the driving of the inverter 602 stops in S15, the temperature difference calculation portion 40 communicates to the current limit setting portion 202 of the second system. The temperature difference calculation portion 40 reduces the current limiting values Id2, Iq2** and controls an output limit value of the inverter 602**.

As described above, the two inverters 601, 602 are configured to have an arrangement of the switching elements, a wiring pattern on a substrate, a heat radiating resistance, or the like on the substrate 70, which may become equivalent in the two inverters. Therefore, heat generated at the time of use may be equal to each other essentially. When the system-to-system temperature difference ΔTs is equal to or more than the temperature difference threshold ΔTx, this state may correspond to a state that is deviated from a desired state. Thus, in the temperature difference monitoring processing of the present embodiment, an abnormality is detected by determining a temperature abnormality from a relative viewpoint.

Figure 7:
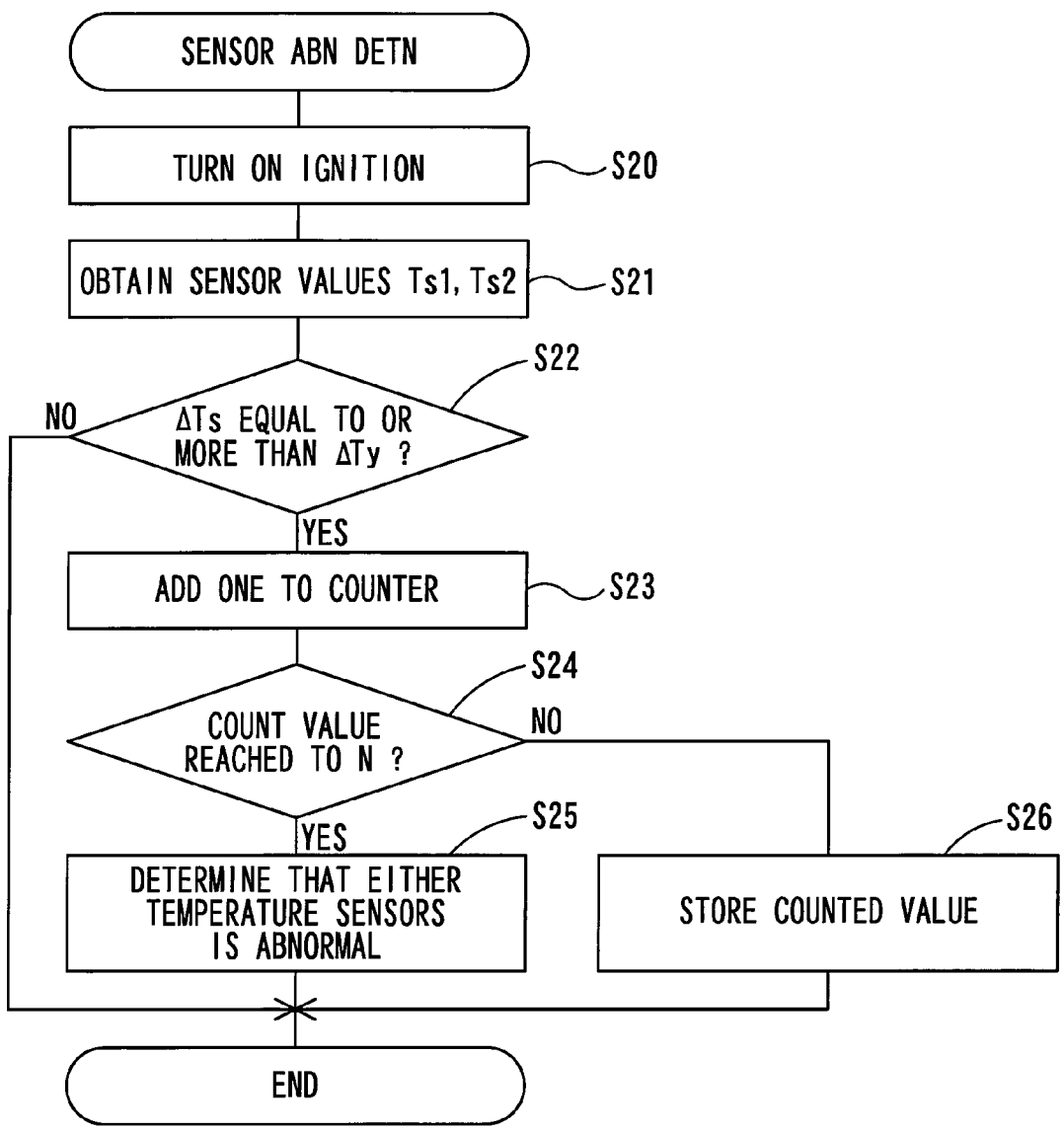
FIG. 7 is a flowchart of a temperature sensor abnormality detection processing in the first embodiment of the present disclosure.

A temperature sensor abnormality detection processing by the temperature difference calculation portion 40 will be explained with referring to a flowchart of FIG. 7. The temperature sensor abnormality detection processing is performed when the apparatus is powered on multiple times. In the present embodiment, the temperature sensor abnormality detection processing is performed at the time of multiple times of an ignition ON.

When the ignition is turned ON in S20, the temperature difference calculation portion 40 obtains the sensor value Ts1 of the first temperature sensor 41, and the sensor value Ts2 of the second temperature sensor 42 in S21.

In S22, the temperature difference calculation portion 40 calculates the system-to-system temperature difference ΔTs and compares with the initial temperature difference threshold ΔTy. Incidentally, the initial temperature difference threshold ΔTy may be the same with the temperature difference threshold ΔTx in the temperature difference monitoring processing, or may be different from the temperature difference threshold ΔTx.

When the system-to-system temperature difference ΔTs is equal to or more than the initial temperature difference threshold ΔTy (S22: YES), a counter (not shown) is incremented in S23 (that is, one is added to a counted value of the counter). When the counted value is not reached to an N time, which is a predetermined number of times (S24: NO), the counted value is kept at the time of an ignition OFF in S26. A determination in S22 is again performed at the next time of the ignition ON. In this manner, when the counted value reaches to N times (S24: YES), the processing is moved to S25. It is determined that one of the temperature sensors 41, 42 is unusual in S25.

That is, when the ignition is turned off, and a certain amount of period has been passed, it is considered that the motor control apparatus 10 is fully cooled. Therefore, when the ignition is turned next time, it is supposed that the sensor value Ts1 of the first temperature sensor 41 and the sensor value Ts2 of the second temperature sensor 42 become almost equivalent to each other. Nevertheless when the system-to-system temperature difference ΔTs is equal to or more than the initial temperature difference threshold ΔTy over the multiple time of the ignition ON, it may be supposed that one of the temperature sensors 41, 42 is abnormal.

The predetermined number of times in a determination of S24 or a required degree of a continuity may be set up arbitrarily. For example, the counted value may be reset when a determination of NO in S22 occurs once.

When it is determined that one of the temperature sensors 41, 42 is abnormal, it may be supposed that an operator is notified by a warning lamp or the like, and is encouraged to go to a dealer or the like early for exchanging parts.

Technical effects of the motor control apparatus 10 according to the present embodiment will be explained. In the explanation, it is supposed that the sensor value Ts1 of the first temperature sensor 41 is higher than the sensor value Ts2 of the second temperature sensor 42.

(1) Conventionally, the temperature abnormality is determined whether each of the sensor value Ts1 of the first temperature sensor 41 and the sensor value Ts2 of the second temperature sensor 42 exceeds a respective predetermined temperature threshold. This determination manner corresponds to an absolute viewpoint. Therefore, as long as the sensor values Ts1 , Ts2 are in allowable temperature ranges to the temperature threshold, a slight abnormality that is somewhat deviated from a required state may not be detected.

On the contrary, according to the present disclosure, since the temperature abnormality is determined based on the system-to-system temperature difference ΔTs, it may be possible to widely detect a slight abnormality that may not result in a destruction of an element. This determination manner may be referred to as a relative viewpoint.

For example, it is supposed that an application condition of the heat radiation gel 74, which is described in FIG. 4, have variation at the time of a manufacture of the motor control apparatus 10. Specifically, it is supposed that, in one of the systems (for example, the second system), the heat radiation gel 74 is applied properly, and a heat radiation is enough secured from the back surface Sb of the switching element 62 to the heat sink 75, and it is supposed that, in the other of the systems (for example, the first system), the heat radiation gel 74 is in short, and a heat radiation is insufficient from the back surface Sb of the switching element 61 to the heat sink 75. In this case, the switching element 61 of the first system may radiate heat from the mounting surface Sm through the substrate 70, and the switching element 61 may not be resulted in a malfunction immediately. However, the switching element 61 is always used in a worse condition as compared with the switching element 62 of the second system, and therefore, an initial performance and a durability performance may be different between the systems. This situation may be undesirable.

This kind of temperature abnormality may not be detected conventionally. On the contrary, it may be possible that the motor control apparatus according to the present disclosure detects this kind of a temperature abnormality. For example, it is possible that a high quality product with a small variation between systems is produced and shipped by monitoring the system-to-system temperature difference ΔTs in an inspection process of a manufacturing stage. In another case, it is supposed that the motor control apparatus is mounted to a vehicle, deterioration with time or a crack in the solder 73 or the heat radiation gel 74 may occur, and the heat radiation performance may be reduced in either of the systems. In this case, since it is possible that an imbalance of a heat radiation between systems may be detected at an early stage according to the present embodiment, it may be possible to prevent a malfunction of the elements beforehand.

(2) When the system-to-system temperature difference ΔTs is equal to or more than the temperature difference threshold ΔTx, the temperature difference calculation portion 40 communicates to the current limit setting portion 201 of the first system, the detection temperature of which is higher than the detection temperature of the second system, and reduces the current limiting values Id1\*\*, Iq1\*\*. When each of the sensor values Ts1, Ts2 is in the allowable temperature range absolutely, it is unnecessary to stop the driving of the inverter 601 of the first system completely.

Then, according to a situation, the current limiting values Id1\*\*, Iq1\*\* may be reduced, and the inverter 601 may be continued to drive while limiting the driving of the inverter 601. Accordingly, for example, in the motor control apparatus 10 applied to the electric power steering apparatus 1, by partially using an output of one of the two systems, it is possible that a total output of the two systems is prevented from being reduced extremely, and that an influence on a steering property of the operator is reduced. In addition, it is possible to prevent an excessive load from being applied to a normal system (the other of the two systems) as compared with a case when only the normal system is driven.

(3) A degree, to which the current limiting values Id1\*\*, Iq1\*\* are reduced in the above section (2), may be set appropriately. For example, in a case where the sufficient output is obtained by the driving of only the normal system, and the excessive load is not applied to the normal system, the current limiting values Id1\*\*, Iq1\*\* may be minimized to zero, and the driving of the inverter 601 may be stopped. Thus, since it is possible that the same logic of "reducing a current limiting value" may be applied in both cases when the driving of the inverter 601 is limited or stopped, the control may be simplified.

(4) In the present embodiment, when the temperature sensor abnormality detection processing is performed over the multiple time of the ignition ON, and the number of times that it is determined that a system-to-system temperature difference ΔTs is equal to or more than the initial temperature difference threshold ΔTy reaches a predetermined number of times, it is determined that either the first temperature sensor 41 or the second temperature sensor 42 may be abnormal. Accordingly, the abnormality of the temperature sensors 41, 42 may be discovered early, and it may be possible to prevent an erroneous detection originated from an abnormality of the temperature sensors 41, 42 beforehand.

(Second Embodiment)

A second embodiment of the present disclosure will be described with referring to a flowchart of FIG. 8, and a pattern table of FIG. 9. The second embodiment has a substantially identical configuration with respect to a circuit configuration (referring to FIG. 1 and FIG. 5). The second embodiment performs a processing that is further applied from the temperature difference monitoring processing (referring to FIG. 6) in the first embodiment.

Figure 8:
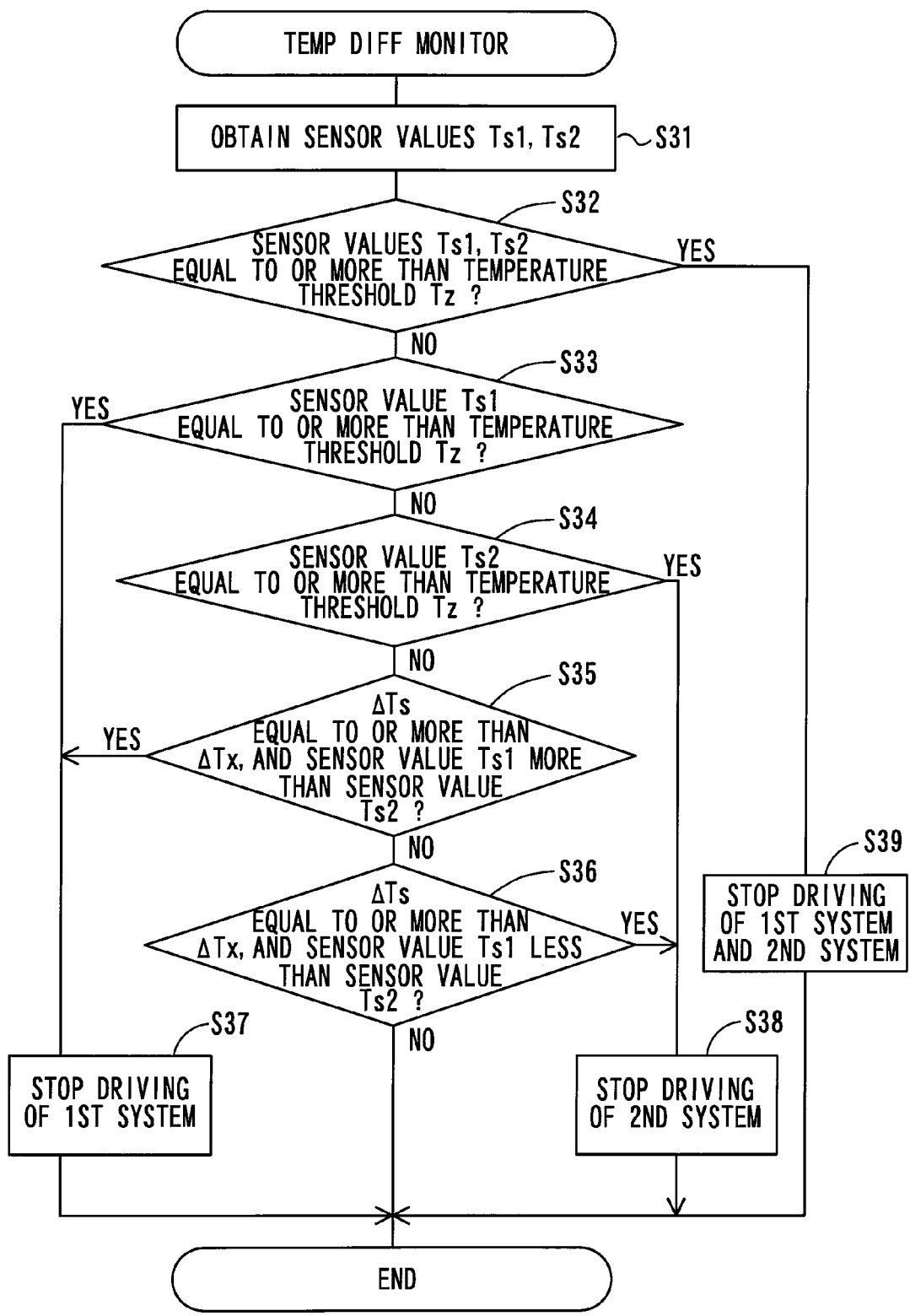
FIG. 8 is a flowchart of a temperature difference monitoring processing in the second embodiment of the present disclosure.

In S31 of FIG. 8, the temperature difference calculation portion 40 obtains the sensor value Ts1 of the first temperature sensor 41, and the sensor value Ts2 of the second temperature sensor 42. Initially, the sensor values Ts1, Ts2 are compared with a temperature threshold Tz. The temperature threshold Tz is set into a temperature value, which is considered that heat generation of the switching elements in the inverters 601, 602 represents an abnormality absolutely. That is, when a sensor value of one of the two systems is equal to or more than the temperature threshold Tz, the one of the two systems is required to stop a driving of the inverter immediately from a viewpoint of a failsafe.

FIG. 9 describes a driving propriety determination of an inverter in each temperature pattern when it is supposed that the sensor value Ts1 of the first temperature sensor 41 is higher than the sensor value Ts2 of the second temperature sensor 42. In a column "determination (DET)", a circle represents that the inverter of the system continues to drive, and a cross represents that the inverter of the system stops driving.

In FIG. 8, when the sensor values Ts1, Ts2 are equal to or more than the temperature threshold Tz (S32: YES), the driving of the inverters 601, 602 of both systems are stopped in S39. When S32 corresponds to NO, and the sensor value Ts1 is equal to or more than the temperature threshold Tz (S33: YES), the driving of the inverter 601 of the first system is stopped in S37. When S32 corresponds to NO, and the sensor value Ts2 is equal to or more than the temperature threshold Tz (S34: YES), the driving of the inverter 602 of the second system is stopped in S38.

Incidentally, in the steps so far, the system-to-system temperature difference ΔTs is not considered.

When both of the sensor values Ts1, Ts2 are less than the temperature threshold Tz (S34: NO), the temperature abnormality is determined based on the system-to-system temperature difference ΔTs similar with the processing in FIG. 6 in the first embodiment in S35 and S36. That is, when the system-to-system temperature difference ΔTs is equal to or more than the temperature difference threshold ΔTx, the driving of the inverter of the system with a higher sensor value is stopped (S37, S38).

Alternatively, when S35 or S36 corresponds to YES, the current limiting value may be reduced and the inverter may continue to drive instead of stopping the driving of the inverter of the system with a higher sensor value, similar with the first embodiment.

In addition to the effects of the first embodiment, it is possible that the second embodiment prevents the element from being destroyed beforehand to the absolute temperature abnormality from a viewpoint of failsafe.

(Another Embodiment)

According to the embodiment, when the driving of the inverters 601, 602 of either of the systems is stopped, the controllers 651, 652 causes the current limiting value of the current limit setting portions 201, 202 to be zero. Alternatively, the controller may turn off a driving signal to a gate of the switching element, or may intercept the power supply relay.

The two-system motor control apparatus according to the present embodiment includes the inverters 601, 602 in which a bridge connection is formed by six switching elements per system as a power inverter circuit. The two-system motor control converts DC power of the battery 51 into a three-phase alternating current (AC) power, and drives the three-phase brushless motor 80. Alternatively, the two-system motor control apparatus according to the present disclosure may include an H bridge circuit in which a bridge connection is formed with four switching elements per system, and may drive a DC motor with a brush.

A specific configuration of the motor control apparatus 10 is not limited to the configuration of the present embodiment. For example, the switching element may be other kinds of a field-effect transistor other than MOSFET, IGBT, or the like. There may not be any power supply relay corresponding to a reverse connection as described in the power supply relay parts 551, 552.

It should be noted that, in the present embodiment, phase differences of the three-phase AC power outputted by the two-system inverters 601, 602 is not especially mentioned. In the block diagram of FIG. 5, the electrical angles fed back from the rotation angle sensor 85 to the two systems of the controllers 651, 652 are represented as "κ". However, the phases of the two systems of the AC power may be shifted each other by 30 degree, for example, similar with a two-system motor control apparatus described in JP-A-2013-34280 corresponding to US 2013/0033210A1.

The motor control apparatus according to the present disclosure is not limited to a motor used in an electrical power steering apparatus. The motor control apparatus may be applied to any kind of motor used various applications. In addition, a use of the motor control apparatus according to the present disclosure is not limited to a generation of torque, and the motor control apparatus may be used as a control apparatus for a power generator generating a regenerative power. Therefore, the step "ignition ON" in the temperature sensor abnormality detection processing (referring to FIG. 7) may be replaced as an operation such as "turning on a power" according to an apparatus applied with the motor control apparatus.

It should be noted that the present disclosure is not limited to the above described embodiments. The present disclosure may be performed in various forms without departing from the scope of the present disclosure.

According to one aspect of the present disclosure, a motor control apparatus controlling a driving of a motor having two pairs of winding sets. The control apparatus has power inverter circuits provided corresponding to the two pairs of winding sets, the two power inverter circuits supply power to the winding sets, and the two power inverter circuits have mutually equivalent specification and mutually equivalent electrical performance. The control apparatus has a first temperature sensor detecting a temperature of a power inverter circuit in a first system, a second temperature sensor detecting the temperature of a power inverter circuit of a second system, a current command value calculation portion, a controller for each system, and a temperature difference calculation portion.

The current command value calculation portion calculates a current command value supplied to a motor.

The controller for each system has a current limit setting portion setting up a current limiting value used as an upper limit of a current command value, and controls an output to the power inverter circuit by a current feedback control.

The temperature difference calculation portion obtains detection temperatures of the first temperature sensor and the second temperature sensor, and calculates a system-to-system temperature difference, which corresponds to an absolute value of a difference of the detection temperatures of the first temperature sensor and the second temperature sensor.

When the system-to-system temperature difference is equal to or more than a predetermined temperature difference threshold, the controller stops a driving of the power inverter circuit of one system with a higher detection temperature, or reduces the current limiting value of the power inverter circuit of the one system.

That is, according to one aspect of the present disclosure, a motor control apparatus controlling a driving of a motor having two pairs of winding sets is provided. The motor control apparatus includes a current command value calculation portion calculating a current command value supplied to the motor, a first system, a second system, and a temperature difference calculation portion obtaining the first detection temperature and the second detection temperature and calculating a system-to-system temperature difference. The first system includes a first power inverter circuit provided to the motor control apparatus, corresponding to one of the two pairs of the winding sets and supplying electricity to the one of the two pairs of the winding sets, and a first temperature sensor detecting a first detection temperature of the first power inverter circuit, a first current limit setting portion setting up a current limiting value, which is an upper limit of the current command value, and a first controller controlling an output to the first power inverter circuit by a current feedback control to the first system. The second system includes a second power inverter circuit provided to the motor control apparatus, corresponding to an other of the two pairs of the winding sets and supplying electricity to the other of the two pairs of the winding sets, in which the first power inverter circuit and the second power inverter circuit have an equivalent specification and an equivalent electrical performance, a second temperature sensor detecting a second detection temperature of the second power inverter circuit, a second current limit setting portion setting up the current limiting value, which is the upper limit of the current command value, and a second controller controlling the output to the second power inverter circuit by the current feedback control to the second system. The system-to-system temperature difference is defined as an absolute value of a difference of the first detection temperature and the second detection temperature. One of the first controller and the second controller stops a driving of one of the first power inverter circuit and the second power inverter circuit or reduces the current limiting value of the one of the first power inverter circuit and the second power inverter circuit when the system-to-system temperature difference is equal to or more than a predetermined temperature difference threshold. The one of the first power inverter circuit and the second power inverter circuit is included in one of the first system and the second system having a detection temperature higher than an other of the first system and the second system.

According to the present disclosure, since the temperature abnormality is determined based on the system-to-system temperature difference from a relative viewpoint, it may be possible to detect an abnormality that absolutely exceeds the temperature threshold, and in addition, it may be possible to widely detect a slight abnormality that may not result in a destruction of an element.

In addition, in the slight abnormality to that extent, the driving of the power inverter circuit of the system with a higher detection temperature than the other system may not require to stop thoroughly. Therefore, the controller may reduce the current limiting value according to a state, so that the power inverter circuit may continuously drive while being limited. Accordingly, it may be possible to prevent a total output of the two systems from being declined extremely, or it may be possible to prevent an excessive load from being applied to a normal system.

In addition, the temperature difference calculation portion may obtain initial detection temperatures of the first temperature sensor and the second temperature sensor after the motor control apparatus is powered on. When the number of times that it is determined that a system-to-system temperature difference is equal to or more than a predetermined initial temperature difference threshold reaches a predetermined number of times over multiple times of powering on, either the first temperature sensor or the second temperature sensor may be determined with an abnormal.

Accordingly, the abnormality of the temperature sensor may be discovered early, and it may be possible to prevent an erroneous detection originated from the abnormality of the temperature sensor beforehand.

Furthermore, it may be possible that the present disclosure is combined with a temperature abnormality determination based on an absolute temperature threshold. That is, when the detection temperature of the first temperature sensor or the second temperature sensor obtained by the temperature difference calculation portion is equal to or more than the predetermined temperature threshold, the controller may stop the driving of the power inverter circuit, in which the detection temperature is equal to or more than a predetermined temperature threshold. Accordingly, it may be possible to prevent the element from being destroyed beforehand from a viewpoint of a failsafe.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A motor control apparatus controlling a driving of a motor having two pairs of winding sets, comprising:
    a current command value calculation portion calculating a current command value supplied to the motor;
    a first system including
        a first power inverter circuit provided to the motor control apparatus corresponding to one of the two pairs of the winding sets, and supplying electricity to the one of the two pairs of the winding sets,
        a first temperature sensor detecting a first detection temperature of the first power inverter circuit,
        a first current limit setting portion setting up a current limiting value, which is an upper limit of the current command value, and
        a first controller controlling an output to the first power inverter circuit by a current feedback control to the first system;
    a second system including
        a second power inverter circuit provided to the motor control apparatus, corresponding to an other of the two pairs of the winding sets, and supplying electricity to the other of the two pairs of the winding sets, wherein the first power inverter circuit and the second power inverter circuit have an equivalent specification and an equivalent electrical performance,
        a second temperature sensor detecting a second detection temperature of the second power inverter circuit,
        a second current limit setting portion setting up the current limiting value, which is the upper limit of the current command value, and
        a second controller controlling the output to the second power inverter circuit by the current feedback control to the second system; and
    a temperature difference calculation portion obtaining the first detection temperature and the second detection temperature to calculate a system-to-system temperature difference, wherein:
    the system-to-system temperature difference is defined as an absolute value of a difference of the first detection temperature and the second detection temperature,
    one of the first controller and the second controller stops a driving of one of the first power inverter circuit and the second power inverter circuit or reduces the current limiting value of the one of the first power inverter circuit and the second power inverter circuit when the system-to-system temperature difference is equal to or more than a predetermined temperature difference threshold, and
    the one of the first power inverter circuit and the second power inverter circuit is included in one of the first system and the second system having a detection temperature higher than an other of the first system and the second system,
    the one of the first controller and the second controller sets the current limiting value of the one of the first power inverter circuit and the second power inverter circuit into zero and stops the driving of the one of the first power inverter circuit and the second power inverter circuit, when the system-to-system temperature difference is equal to or more than the predetermined temperature difference threshold, and
    the one of the first power inverter circuit and the second power inverter circuit corresponds to the one of the first system and the second system having the detection temperature higher the other of the first system and the second system.

2. The motor control apparatus according to claim 1, wherein
    the first controller stops the driving of the first power inverter circuit included in the first system when the first detection temperature obtained by the temperature difference calculation portion is equal to more than a predetermined temperature threshold, and
    the second controller stops the driving of the second power inverter circuit included in the second system when the second detection temperature obtained by the temperature difference calculation portion is equal to more than a predetermined temperature threshold.

3. A motor control apparatus controlling a driving of a motor having two pairs of winding sets, comprising:
- a current command value calculation portion calculating a current command value supplied to the motor;
- a first system including
  - a first power inverter circuit provided to the motor control apparatus corresponding to one of the two pairs of the winding sets, and supplying electricity to the one of the two pairs of the winding sets,
  - a first temperature sensor detecting a first detection temperature of the first power inverter circuit,
  - a first current limit setting portion setting up a current limiting value, which is an upper limit of the current command value, and
  - a first controller controlling an output to the first power inverter circuit by a current feedback control to the first system;
- a second system including
  - a second power inverter circuit provided to the motor control apparatus, corresponding to an other of the two pairs of the winding sets, and supplying electricity to the other of the two pairs of the winding sets, wherein the first power inverter circuit and the second power inverter circuit have an equivalent specification and an equivalent electrical performance,
  - a second temperature sensor detecting a second detection temperature of the second power inverter circuit,
  - a second current limit setting portion setting up the current limiting value, which is the upper limit of the current command value, and
  - a second controller controlling the output to the second power inverter circuit by the current feedback control to the second system; and
- a temperature difference calculation portion obtaining the first detection temperature and the second detection temperature to calculate a system-to-system temperature difference, wherein:
- the system-to-system temperature difference is defined as an absolute value of a difference of the first detection temperature and the second detection temperature,
- one of the first controller and the second controller stops a driving of one of the first power inverter circuit and the second power inverter circuit or reduces the current limiting value of the one of the first power inverter circuit and the second power inverter circuit when the system-to-system temperature difference is equal to or more than a predetermined temperature difference threshold, and
- the one of the first power inverter circuit and the second power inverter circuit is included in one of the first system and the second system having a detection temperature higher than an other of the first system and the second system,
- the temperature difference calculation portion obtains the first detection temperature of the first temperature sensor and the second detection temperature of the second temperature sensor after powering on the motor control apparatus, and
- the temperature difference calculation portion determines that either the first temperature sensor or the second temperature sensor has an abnormality when a total number of times determined that the system-to-system temperature difference is equal to or more than a predetermined initial temperature difference threshold reaches a predetermined number of times in a plurality of times of powering on of the motor control apparatus.

4. The motor control apparatus according to claim 3, wherein
- the first controller stops the driving of the first power inverter circuit included in the first system when the first detection temperature obtained by the temperature difference calculation portion is equal to more than a predetermined temperature threshold, and
- the second controller stops the driving of the second power inverter circuit included in the second system when the second detection temperature obtained by the temperature difference calculation portion is equal to more than a predetermined temperature threshold.

* * * * *